(12) United States Patent
Lund et al.

(10) Patent No.: US 8,166,258 B2
(45) Date of Patent: Apr. 24, 2012

(54) SKIP OPERATIONS FOR SOLID STATE DISKS

(75) Inventors: Timothy Lund, Rochester, MN (US); Carl Forhan, Rochester, MN (US); Timothy Swatosh, Rochester, MN (US); Pamela Hempstead, Oronoco, MN (US); Michael Hicken, Rochester, MN (US); Bryan Holty, Rochester, MN (US); John Paradise, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 452 days.

(21) Appl. No.: 12/508,915

(22) Filed: Jul. 24, 2009

(65) Prior Publication Data

US 2011/0022779 A1    Jan. 27, 2011

(51) Int. Cl.
*G06F 13/00* (2006.01)
(52) U.S. Cl. .......................... 711/154; 711/103; 711/163
(58) Field of Classification Search .................. 711/103, 711/154, 163
See application file for complete search history.

(56) References Cited

U.S. PATENT DOCUMENTS

2007/0028040 A1* 2/2007 Sinclair .......................... 711/113

OTHER PUBLICATIONS

Andrew Birrell & Michael Isard, et al., A Design for High-Performance Flash Disks, ACM SIGOPS Operating Systems Review, vol. 41, Issue 2, pp. 88-93, (Apr. 2007).
Jeong-Uk Kang & Heeseung Jo, et al., A Superblock-Based Flash Translation Layer for NAND Flash Memory, Proceedings of the 6th ACM & IEEE International Conference on Embedded Software, pp. 161-170, (Oct. 22-25, 2006).
Sun et al.; On the Use of Strong BCH Codes for Improving Multilevel NAND Flash Memory Storage Capacity; ECSE Department, Rensselaer Polytechnic Institute, Aug. 2006; USA.
Micro Technology, Inc.; NAND Flash 101: An Introduction to NAND Flash and How to Design it into your next Product; TN-29-19; 2006; pp. 1-28; Micron Technology, Inc. Boise, Idaho, USA.

* cited by examiner

*Primary Examiner* — Reba I Elmore

(57) ABSTRACT

Described embodiments provide skip operations for transferring data to or from a plurality of non-contiguous sectors of a solid-state memory. A host layer module sends data to, and receives commands from, a communication link. Received commands are one of read requests or write requests, with commands including i) a starting sector address, ii) a skip mask indicating the span of all sector addresses in the request and the sectors to be transferred, iii) a total number of sectors to be transferred; and, for write requests, iv) the data to be written to the sectors. A buffer stores data for transfer to or from the solid-state memory. A buffer layer module i) manages the buffer, ii) segments the span of the request into a plurality of chunks, and iii) determines, based on the skip mask, a number of chunks to be transferred to or from the solid-state memory.

20 Claims, 5 Drawing Sheets

300

500

SKIP OPERATIONS FOR SOLID STATE DISKS

CROSS-REFERENCE TO RELATED APPLICATIONS

The subject matter of this application is related to U.S. patent application Ser. No. 12/436,227 filed May 6, 2009, Ser. No. 12/477,996 filed Jun. 4, 2009, Ser. No. 12/478,013 filed Jun. 4, 2009, and Ser. No. 12/508,879 filed Jul. 24, 2009, the teachings of all of which are incorporated herein in their entireties by reference. The subject matter of this application is also related to U.S. patent application Ser. No. 12/475,710 filed Jun. 1, 2009, Ser. No. 12/475,716 filed Jun. 1, 2009, Ser. No. 12/643,471 filed Dec. 21, 2009, Ser. No. 12/649,490 filed Dec. 30, 2009, Ser. No. 12/722,828 filed Mar. 12, 2010, Ser. No. 12/730,627 filed Mar. 24, 2010, Ser No. 12/731,631 filed Mar. 25, 2010, Ser. No. 12/767,985 filed Apr. 27, 2010, Ser. No. 12/768,058 filed Apr. 27, 2010, Ser. No. 12/769,882 filed Apr. 29, 2010 and Ser. No. 12/769,910 filed Apr. 29, 2010.

BACKGROUND OF THE INVENTION

1. Field of the Invention

The present invention relates to flash memory storage devices, and, in particular, to skip operations for solid state disks (SSDs).

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

Other storage devices, such as conventional hard disk drives (HDDs), support additional disk-access operations, such skip-write and skip-read. A skip operation is used for reading or writing relatively closely located, but non-contiguous, blocks on an HDD. The device requesting the skip-read or skip-write provides a starting logical block address (LBA), a length count of the number of blocks to read/write, and a skip mask. The skip mask comprises a number of bits where each bit in the mask corresponds to a block offset from the starting block address. A logic '1' bit in the skip mask signifies that the block corresponding to that bit position will be read/written. A logic '0' bit in the skip mask signifies that the block corresponding to that bit position will not be read/written and will be skipped. The length count comprises the total number of blocks to transfer, not the span of the request. Thus, the length count matches the total number of logic '1' bits in the skip mask. HDDs process skip commands at a media layer of the network, for example corresponding to a layer in the OSI ("Open Systems Interconnection") model. A skip operation is useful for reading or writing several non-contiguous memory locations without issuing separate requests and requiring additional revolutions of the HDD. Further, only the requested data is transferred to or from the HDD.

A hard disk is addressed linearly by logical block address (LBA). A hard disk write operation provides new data to be written to a given LBA. Old data is over-written by new data at the actual LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page from the page previously used for that LBA. Therefore, NAND devices require device driver software, or a separate controller chip, to maintain a record of mappings of each LBA to the current page number where its data is stored. This record mapping is typically performed by a flash translation layer (FTL) in software that might generate a logical to physical translation table. The flash translation layer corresponds to the media layer of software controlling an HDD.

Associated with each page is a spare area (typically 100-500 bytes) generally used for storage of error correction code (ECC) information and for storage of metadata used for memory management. The ECC is for detecting and correcting errors in the user data stored in the page, and the metadata is used for mapping logical to physical addresses and vice-versa. As such, the additional bytes of memory are "hidden" from the user and are not available for storing data. The first block (block 0) of a flash die is generally provided from the manufacturer error-free, and is commonly used by designers to include program code and associated metadata for block management.

Typically, for high capacity solid state disks (SSDs), several design tradeoffs might be considered when implementing a method to maintain a logical to physical translation table. These tradeoffs typically include: efficient random access memory (RAM) usage; efficient flash usage; fast address lookup for both read operations and write operations; and fast reconstruction of the translation table on device startup.

Several techniques are known in the art for maintaining the logical to physical translation table. One such approach is known as direct page mapping, an example of which is described in the paper by Andrew Birrell & Michael Isard, et al., A DESIGN FOR HIGH-PERFORMANCE FLASH DISKS, *ACM SIGOPS Operating Systems Review*,Vol. 41,Issue 2,pp. 88-93,(April 2007), which is incorporated herein by reference in its entirety (hereinafter "Birrell"). Direct page mapping maintains a lookup table in RAM having an entry for each flash page, and a summary page for metadata at the end of each block, from which the logical to physical translation table may be reconstructed at startup. For example, a direct page mapped translation table might contain, for every LBA, a logical sector number corresponding to a physical block number and a physical page number. Thus, direct page mapping comprises a single-level logical to physical translation. The summary page for each block might contain the LBA and valid bits for each page in the block so that the translation table can be reconstructed at startup. Thus, the direct page mapping scheme requires a large amount of RAM (on the order of 1-2 MB per GB of user storage) to store the translation table, which can become burdensome for higher capacity SSDs.

Another approach is known as block mapping. Block mapping generally classifies blocks as either data blocks (D-blocks) or update blocks (U-blocks). The total size of the D-blocks is the effective storage space for user data while U-blocks are invisible to users. Generally, when a write command cannot be accommodated in the D-block corresponding to the LBA, a U-block is allocated to receive the new data and the old data in the D-block is invalidated. Subsequent writes to that D-block will be received by the allocated U-block. When the U-block becomes full, another U-block might be allocated, or the U-block might be merged with the original D-block. Thus, block mapping maintains a lookup table in RAM that maps a logical block to a physical block. Block mapping lacks a page-level map, instead relying on the typical case that data is stored in sequential order within the block. For example, a block mapped translation table might contain a logical sector number corresponding to a logical block number and a logical page number. The logical block number can be translated into a physical block number and the logical page number might correspond to a physical offset within the physical block. Thus, block mapping comprises a two-level logical to physical translation. The size of the translation table is proportional to the number of blocks in the flash memory, thus requiring less RAM than a page mapped translation table.

However, because block mapping does not have a page-level map, the flash media may be inefficiently utilized when the data access workload is non-sequential. For non-sequential data access workloads, block mapping might require data to be copied and re-written numerous times to maintain the correct mapping. An example of block mapping is described in the paper by Jeong-Uk Kang & Heeseung Jo, et al., A SUPERBLOCK-BASED FLASH TRANSLATION LAYER FOR NAND FLASH MEMORY, *Proceedings of the 6th ACM & IEEE International Conference On Embedded Software*,pp. 161-170,(Oct. 22-25, 2006), which is incorporated herein by reference in its entirety (hereinafter "Kang").

A third approach for maintaining the logical to physical translation table is known as a superblock mapping scheme. Superblock mapping groups together a set number of adjacent logical blocks into a superblock. The superblock mapping scheme maintains a page global directory (PGD) in RAM for each superblock. Page middle directories (PMDs) and page tables (PTs) are maintained in flash. Each LBA can be divided into a logical block number and a logical page number, with the logical block number comprising a super-block number and a PGD index offset. The logical page number comprises a PMD index offset and a PT index offset. Each entry of the PGD points to a corresponding PMD. Each entry of the PMD points to a corresponding PT. The PT contains the physical block number and the physical page number of the data. Super-block mapping, thus, comprises a four-level logical to physical translation and provides page-mapping.

The PMD's and PT's are stored in the spare areas of the flash pages to provide page-mapping without using an excessive amount of RAM. However, because the spare area is being used to store page-level mapping information, less memory is available for error correction codes (ECC). Further, the limited amount of memory available in the spare area precludes storing complicated mapping information. Finally, reconstruction of the translation table at startup can be time-intensive. An example of a superblock mapping scheme is described in Kang.

As described above, for write operations NAND devices store the new data for the LBA on a new page. Thus, NAND devices also generally require that the device driver software or the separate controller chip periodically initiate a process to erase data that is out-of-date. As would be apparent to one of skill in the art, without periodically erasing out-of-date data, the flash memory would fill up with data that is mostly out-of-date. This inefficiency would reduce the realized flash memory capacity because less current data could be stored. Therefore, device driver software or controller chips generally periodically run a "garbage collection" routine adapted to provide efficient flash memory utilization by erasing out-of-date blocks. An example of a garbage collection routine is described in Kang.

However, NAND device blocks can be erased relatively few times before device failure (typically on the order of 100,000 erasures). Therefore, over the operational life of an SSD, blocks of flash memory will fail and become unusable. Thus, the device driver software or the separate controller chip should minimize the number of erasures, and must also maintain a record of bad blocks. For example, device driver software or controller chips might implement wear leveling to spread the erasing and writing of blocks over the entire flash memory to avoid repeatedly erasing and writing a given subset of blocks.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide skip operations for transferring data to or from a plurality of non-contiguous sectors of a solid-state memory. A host layer module sends data to, and receives commands from, a communication link. Received commands are one of read requests or write requests, with the commands including i) a starting sector address, ii) a skip mask indicating the span of all sector addresses in the request and the sectors to be transferred, iii) a total number of sectors to be transferred; and, for write requests, iv) the data to be written to the sectors. A buffer stores data to be transferred to or from the solid-state memory. A buffer layer module i) manages the buffer, ii) segments the span of the request into a plurality of chunks, where each chunk corresponds to at least one sector, iii) determines, based on the skip mask, a number of chunks to be transferred to or from the solid-state memory, and iv) allocates storage space in the buffer corresponding to, for read requests, the number of chunks requiring data to be read, and, for write requests, the number of sectors to be written. A media layer module i) provides, for a read request, data from the solid-state memory to the buffer for each chunk requiring data to be read, and ii) transfers, for a write request, data from the buffer to the solid-state memory for each chunk to be written.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, skip operations for solid state disks (SSDs) are provided. Skip operations, such as skip-read and skip-write, allow a group of non-contiguous data blocks to be transferred that are in a given logical block address (LBA) range. For conventional hard disk drives (HDDs), skip operations allow reading or writing of data blocks within a single revolution of the disk, thereby reducing the number of operations required for transfer of data to and from the disk. While SSDs do not have moving components like HDDs, embodiments of the present invention might provide a similar reduction in the number of host transfers to and from the SSD.

Figure 1:
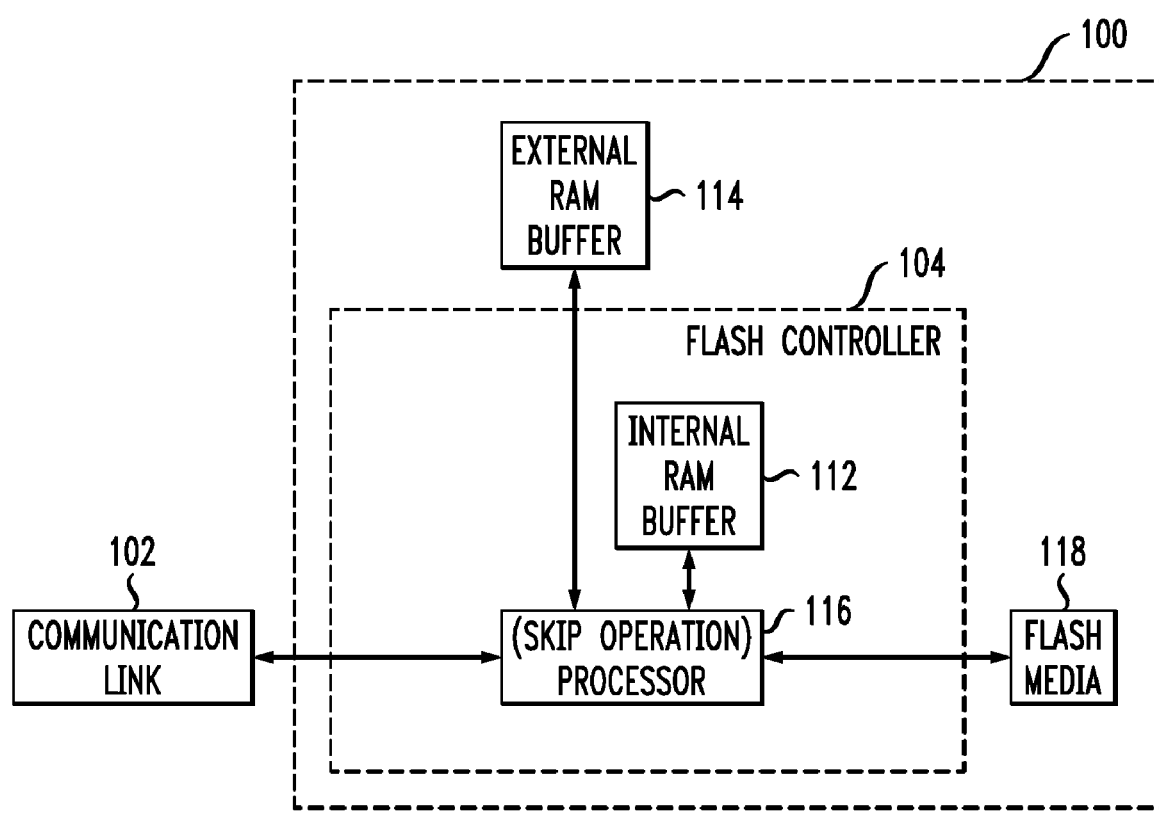
FIG. 1 shows a block diagram of a flash memory storage system implementing skip operations in accordance with exemplary embodiments of the present invention.

FIG. 1 shows a block diagram of flash memory storage system 100 implementing skip operations in accordance with exemplary embodiments of the present invention. As shown, flash memory storage system 100 is electrically coupled to communication link 102. Flash memory storage system 100 comprises flash controller 104 and flash media 118. Communication link 102 is used to communicate with external devices, such as a computer system, that interface with flash memory storage system 100. Communication link 102 might be a custom communication link, or might be a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, or any other similar interface link for connecting a peripheral device to a computer.

Flash controller 104 controls transfer of data between flash media 118 and an external device coupled to communication link 102. Flash controller 104 might be implemented as a system-on-chip (SoC). Flash controller 104 might include internal RAM buffer 112. Flash controller 104 might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between flash media 118 and communication link 102. Although shown in FIG. 1 as a single processor, processor 116 might be implemented by multiple processors (not shown). Processor 116 includes software/firmware as needed for operation, including skip operations in accordance with exemplary embodiments of the present invention, as described subsequently with respect to FIG. 2.

Figure 2:
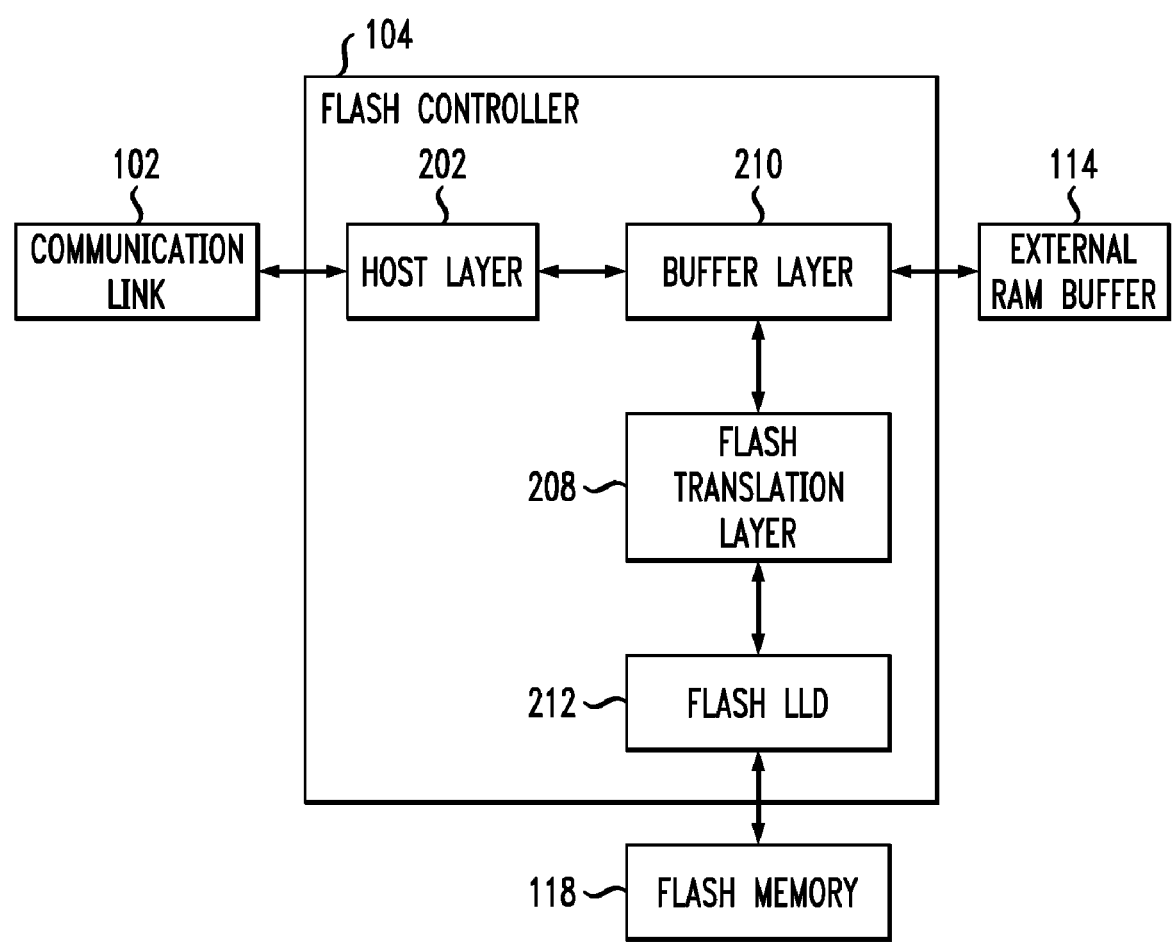
FIG. 2 shows an exemplary functional block diagram of processes employed by the flash memory system of FIG. 1.

FIG. 2 shows an exemplary functional block diagram of process modules implemented as software, hardware, or some combination thereof, for example within processor 116 of flash controller 104. As shown in FIG. 2, host layer 202 implements protocols to control flow of data between communications link 102 and flash controller 104. For example, host layer 202 might process data access commands from communication link 102 and communicate with flash translation layer (FTL) 208. FTL process 208 translates the logical-to-physical addresses (and vice-versa) of data stored in flash media 118, for example, by making flash memory storage system 100 appear similar to a conventional HDD. FTL 208 temporarily stores data in a buffer via buffer layer 210. In general, data transfers between flash media 118 and communication link 102 are buffered in at least one of RAM buffer 114 (shown in FIG. 2) and RAM buffer 112 (not shown in FIG. 2). FTL 208 interfaces with flash media 118 by flash low-level driver 212. Flash low-level driver 212 implements hardware-specific basic read and write operations of flash memory 118, thus, separating the low-level hardware-specific signal and timing requirements of the flash memory circuitry from the functionality of FTL 208. FTL 208 also enables garbage collection, error recovery, and wear leveling routines for flash media 118. Host layer 202, buffer layer 210 and flash translation layer 208 might include Application Programming Interfaces (APIs), which are protocols or formats used by an application to communicate with a different application.

For example, flash controller 104 (FIG. 1) receives requests for flash media access from external devices, such as read or write operations, from communication link 102. Received requests are processed by host layer 202. Host layer 202 i) controls all host interface specific commands (e.g. SATA commands), ii) coordinates host-side data transfers and command execution, and iii) processes any other host commands (e.g. status updates). Host layer 202 is in communication with buffer layer 210. FTL 208 also interfaces with buffer layer 210. Since data transfers between communication link 102 and flash media 118 are temporally stored in buffer memory, buffer layer 210 generally directs the data traffic between host layer 202 and FTL 208. For example, if an external host (not shown) provides, via communication link 102, data to be written to flash media 118, buffer layer 210 might coordinate temporary storage of the data in buffer 114 until FTL 208 coordinates writing the data to flash media 118. Similarly, if the external host requests to read data from flash media 118, buffer layer 210 might temporarily store the data in buffer 114 until host layer 202 coordinates sending the data to the host via communication link 102.

Figure 3:
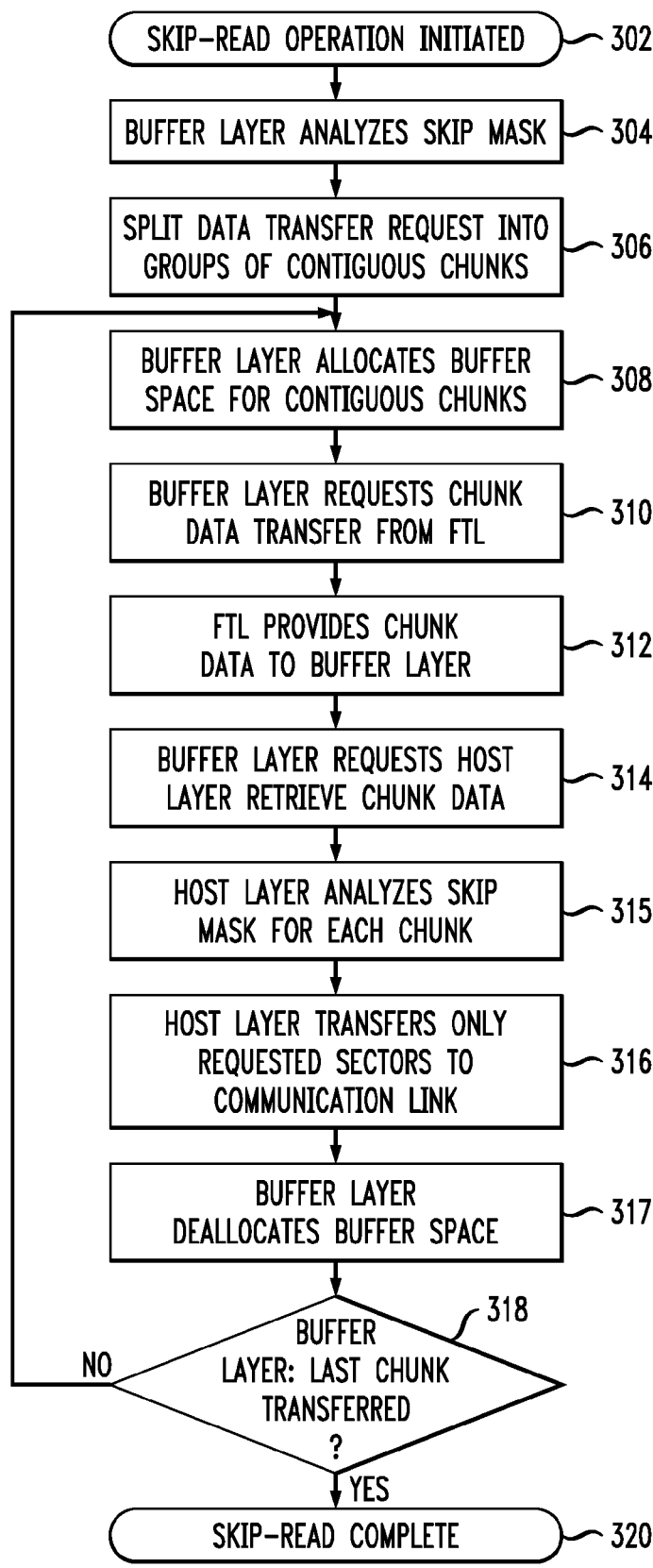
FIG. 3 shows a flow diagram of a skip-read operation, in accordance with exemplary embodiments of the present invention.

FIG. 3 shows a flow diagram of a skip-read operation, in accordance with an exemplary embodiment of the present invention. As shown in FIG. 3 buffer layer 210 responds to a skip-read request from host layer 202 at step 302. At step 304, buffer layer 210 analyzes the skip mask to determine, for example, a number of blocks in the span of the skip-read request, and the number of blocks that require a data transfer. Based on the analysis of step 304, buffer layer 210, at step 306, might segment the skip-read command into smaller internal data transfers. The internal data transfers might include one or more contiguous segments of data ("chunks"). As described subsequently in regard to FIG. 4, each chunk corresponds to a predefined number of LBAs ("sectors"). A starting LBA is retained with each chunk to identify the sectors corresponding to the chunk. A chunk boundary exists between the last LBA of one chunk and the first LBA of the next chunk. Embodiments of the present invention select a chunk size that is approximately equal to the page size of flash media 118 (for example, $2^N$ bytes, where N is an integer). Thus, for example, a transfer segment might include multiple contiguous chunks (e.g. chunks having contiguous LBAs) that require a data transfer for the skip-read operation.

Figure 4:
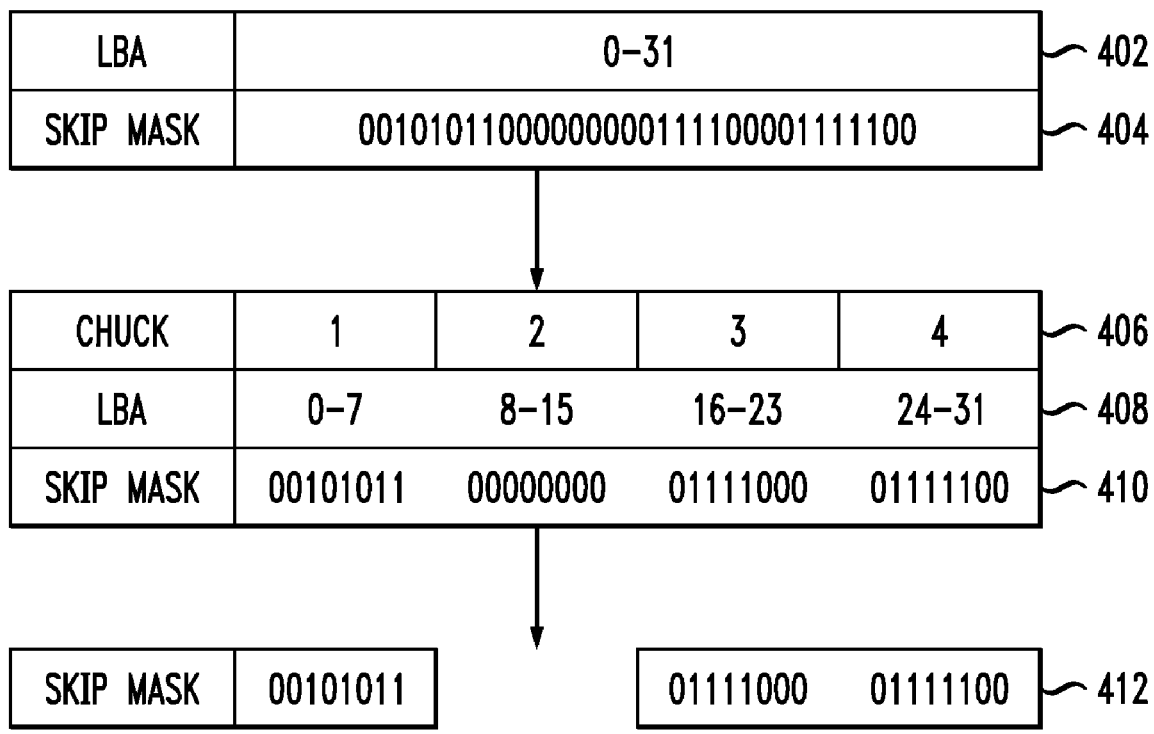
FIG. 4 shows a block diagram of a skip mask, in accordance with exemplary embodiments of the present invention.

FIG. 4 shows a block diagram of a skip mask in accordance with an embodiment of the present invention. As described previously, a skip-read operation includes a starting LBA and a skip mask corresponding to a span of LBAs. The skip mask includes a bit corresponding to each LBA in the span, where a logic '1' signifies that the LBA will be read, and a logic '0' signifies that the LBA will not be read. As shown in FIG. 4, an exemplary skip mask 404 corresponds to LBA span 402. For example, when LBA span 402 is LBAs 0-31, skip mask 404 will be 32 bits long, with one bit corresponding to each LBA in LBA span 402.

Returning to FIG. 3, at step 308, buffer layer 210 allocates buffer space for one or more contiguous chunks in the current segment of the skip-read operation for which data is to be read. As shown in FIG. 4, chunks indicated by the skip mask that do not contain any data to be read are not allocated buffer space and create a gap in contiguous chunks. In the present invention, buffer layer 210 uses the skip mask to allocate buffer space for each chunk of a transfer that has data to be read for the current segment. Thus, at step 308, buffer layer 210 allocates buffer space only for each chunk that is to be read for the current segment, as indicated by the skip mask. During normal read processing, buffer layer 210 allocates buffer space for the entire read and transfers all of the chunks from flash media 118. For skip reads, buffer layer 210 only allocates buffer space for and transfers chunks having at least one block to transfer, as described above.

At step 310, buffer layer 210 requests data, corresponding to at least a portion of the data requested by the skip-read request received at step 302, to be transferred from flash media 118. For example, in embodiments of the present invention, at step 310 buffer layer 210 might request data for one or more contiguous chunks that have at least one sector to be read. At step 312, FTL 208 provides the chunk data, including skipped sectors, to buffer layer 210 and buffer layer 210 temporarily stores the data in buffer 114. At step 314, buffer layer 210 requests that host layer 202 retrieve the chunk data that FTL 208 provided to buffer layer 210 at step 312. At step 315, host layer 202 analyzes the skip mask for each chunk stored in buffer 114 and, at step 316, host layer 202 transfers only the requested sectors, not including skipped sectors, to communication link 102 according to the skip mask. At step 317, buffer layer 210 deallocates the space in buffer 114 that was allocated in step 308 for the current group of one or more chunks. At step 318, if there are more chunks to transfer, processing returns to step 308 for buffer layer 210 to allocate buffer space for the next group of one or more chunks to be processed. If there are no more chunks to be transferred, processing continues to step 320. At step 320, the skip-read operation is complete.

In an embodiment of the present invention, for the skip-read operation shown in FIG. 3, host-side operations, for example steps 315 and 316, for a first group of one or more chunks, and media-side operations, for example steps 310 and 312, for a subsequent group of one or more chunks might be performed in parallel. For example, by segmenting the skip-read operation into smaller transfers of one or more chunks, a first set of chunks might be transferred between FTL 208 and buffer layer 210 (step 312), and host layer 202 might then transfer the first set of chunks to communication link 102 (step 316). Concurrently with one or more of the host-side operations for the first set of chunks, a second set of chunks for the same skip-read operation might be transferred from FTL 208 to buffer layer 210 (step 312), and so on, until all chunks for the skip-read operation are transferred. Thus, embodiments of the present invention provide the ability to perform host side and media side transfers in parallel.

Thus, the design of FTL 208 is simplified because FTL 208 need not track the skip mask. Embodiments of the present invention also reduce the amount of data transferred from flash media 118 to buffer 114 by breaking the skip operation into smaller operations of one or more chunks. The amount of data transferred from flash controller 104 to communication link 102 is also reduced. As described above, the skip mask is analyzed twice: once by buffer layer 210 as it determines how to break up the skip command internally, and once by host layer 202 when it transfers sectors between buffer layer 210 and host layer 202.

Buffer layer 210 might segment a skip-read operation into smaller into smaller internal data transfers. As described above, these internal data transfers might include one or more contiguous chunks, shown in FIG. 4 as chunks 406(1)-406(4). As shown in the example of FIG. 4, each chunk corresponds to 8 contiguous sectors of LBA span 402, but other numbers might be employed. Thus, each of chunks 406(1)-406(4) corresponds to LBA span segments 408(1)-408(4) and skip mask segments 410(1)-410(4). As shown in the example of FIG. 4, chunk 406(2) does not include any sectors to be read, as indicated by its corresponding skip mask segment 410(2). Thus, buffer layer 210 can skip chunk 406(2) entirely when allocating buffer space or requesting FTL 208 retrieve data from flash media 118. Skip mask segments 412 correspond to the skip mask for each chunk having data to be read. For the example of FIG. 4 and as described above with regard to FIG. 3, buffer layer 210 would split the data transfer into two smaller data transfers: one transfer for chunk 412(1), and one transfer for contiguous chunks 412(3) and 412(4).

Figure 5:
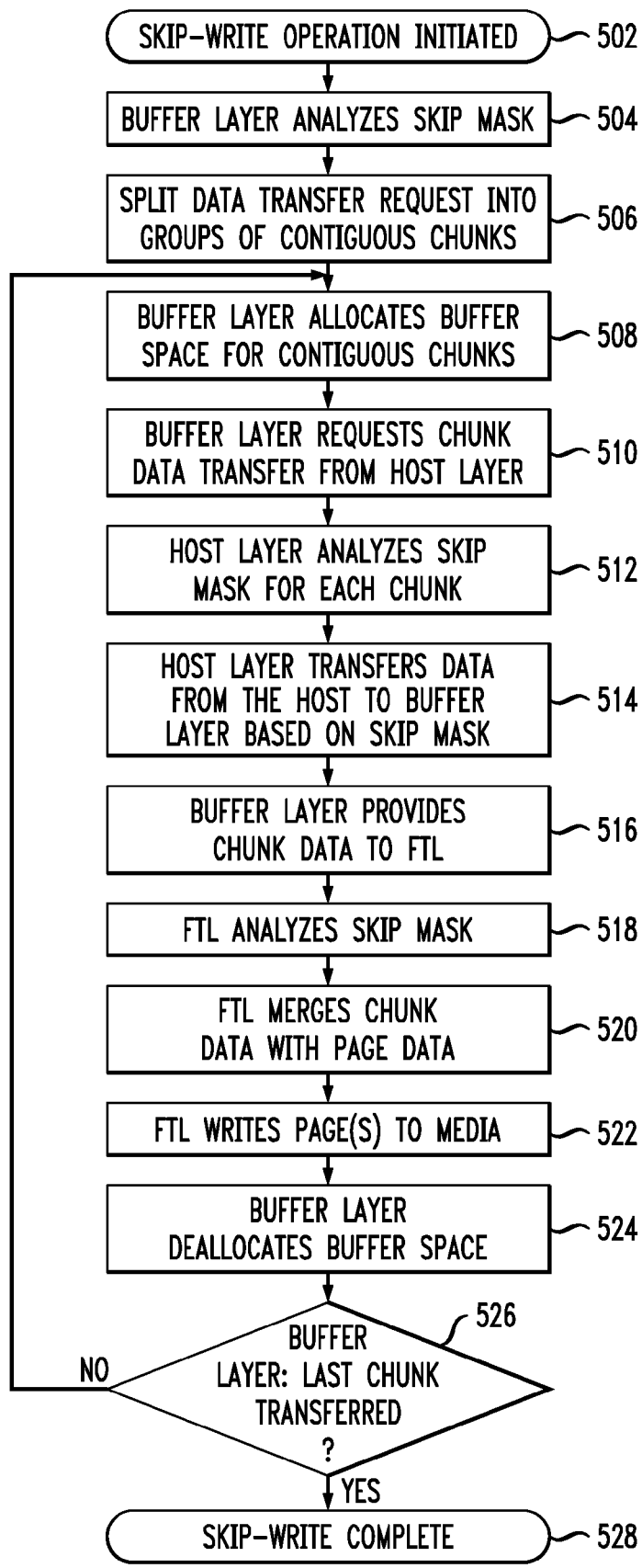
FIG. 5 shows a flow diagram of a skip-write operation, in accordance with exemplary embodiments of the present invention.

FIG. 5 shows a flow diagram of a skip-write operation in accordance with an exemplary embodiment of the present invention. As shown in FIG. 5, at step 502, host layer 202 (FIG. 2) receives a skip-write request from communication link 102 (FIG. 2). At step 504, buffer layer 210 analyzes the skip mask and, at step 506, groups the sectors of the skip-write operation into segments of contiguous chunks based on the starting LBA and the skip mask. At step 508, buffer layer 210 allocates buffer space for chunks in the current segment of contiguous chunks of the skip-write operation being processed. Chunks that do not contain any data to be written, as indicated by the skip mask, are not allocated buffer space and create a gap in contiguous chunks. At step 510, buffer layer 210 requests the data for the current segment of one or more contiguous chunks from host layer 202. At step 512, host layer 202 analyzes the skip mask for each chunk in the segment and transfers data to buffer layer 210 based on the skip mask for storage to buffer 114.

At step 516, buffer layer 210 provides data for the one or more contiguous chunks of the segment to FTL 208. At step 518, FTL 208 analyzes the skip mask for the chunks. As previously described, the data of the skip-write operation includes only data for each sector to be written. However, most commonly used flash media supports only writing full pages, not writing of individual sectors. Thus, at step 520, FTL 208 must, based on the skip mask, merge page data for sectors that do not have data to be written and the data for sectors included in the skip-write operation. At step 522, FTL 208 writes one or more full pages, including new data for the sectors of the skip-write operation, and previous data for all other sectors, to flash media 118. At step 524, buffer layer 210 deallocates the space in buffer 114 allocated at step 508 for the current segment of one or more contiguous chunks. At step 526, if there are additional chunks having data to be written, processing returns to step 508. If there are no additional chunks to be written, at step 528, the skip-write operation is complete.

As described above with regard to the skip-read operations of FIG. 3, in an embodiment of the present invention, for the skip-write operation shown in FIG. 5, media-side operations, for example steps 516 through 522, for a first group of one or more chunks, and host-side operations, for example steps 508 through 514, for a subsequent group of one or more chunks might be performed in parallel. For example, by segmenting the skip-write operation into smaller transfers of one or more chunks, a first set of chunks might be transferred between buffer layer 202 and FTL 208 (step 516) and associated page data might be transferred between FTL 208 and flash media 118 (step 522). Concurrently with one or more of the media-side operations for the first set of chunks, a second set of chunks for the same skip-write operation might be transferred from communication link 102 to host layer 202 and stored by buffer layer 210 (steps 508 through 514), and so on, until all chunks for the skip-write operation are transferred. Thus, embodiments of the present invention provide the ability to perform host side and media side transfers in parallel.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of reading data from a plurality of non-contiguous sectors of a solid-state memory, the method comprising:
   at a host layer:
      receiving a read request to read data from non-contiguous sectors of the solid-state memory, wherein the read request comprises i) a starting sector address, ii) a skip mask indicating a span of sector addresses in the request and the sectors to be read, and iii) a total number of sectors to be read;
   at a buffer layer:
      segmenting the span of the read request into a plurality of chunks, wherein each chunk corresponds to at least one sector;
      determining, based on the skip mask, a number of chunks to be read from the solid-state memory; and
      allocating storage space in the buffer corresponding to the number of chunks to be read; and then:
      transferring, by a flash translation layer, data from the solid-state memory for each chunk to the buffer; and
      transferring to a communication link, by the host layer, only data for requested sectors, based on the skip mask.

2. The invention of claim 1, wherein the step of transferring to the communication link further comprises segmenting the data for requested sectors into a plurality of smaller data transfers comprising one or more contiguous chunks.

3. The invention of claim 1, wherein the step of transferring to a communication link, by the host layer, only data for requested sectors of a first set of one or more chunks, and the step of transferring, by a flash translation layer, data from the solid-state memory to the buffer for a second set of one or more chunks, are performed in parallel.

4. The invention of claim 1, wherein, for the method, the solid-state memory comprises flash memory.

5. The invention of claim 4, wherein, for the segmenting step, each chunk has a size substantially equal to a page size of the flash memory.

6. The invention of claim 1, wherein, for the segmenting step, each chunk corresponds to N sectors, where N is an integer.

7. The invention of claim 1, wherein the method is implemented by a machine executing program code encoded on a machine-readable storage medium.

8. The invention of claim 1, the method further comprising:
after the transferring to the communication link step:
deallocating, by the buffer layer, the storage space in the buffer.

9. A method of writing data to a plurality of non-contiguous sectors of a solid-state memory, the method comprising:
at a host layer:
receiving a write request to write data to non-contiguous sectors of the solid-state memory, wherein the write request comprises i) a starting sector address, ii) a skip mask indicating a span of sector addresses in the request and the sectors to be written, iii) a total number of sectors to be written, and iv) the data to be written to the sectors;
at a buffer layer:
segmenting the span of the write request into a plurality of chunks, wherein each chunk corresponds to at least one sector;
determining, based on the skip mask, a number of sectors to be written to the solid-state memory;
allocating storage space in the buffer corresponding to the number of sectors to be written; and then
transferring from a communication link, by the host layer, data for the provided sectors to the allocated buffer space, based on the skip mask; and
providing to a flash translation layer, based on the skip mask, chunks having data to be written;
at the flash translation layer:
retrieving, from the solid-state memory, page data corresponding to the chunks having data to be written;
merging the chunks having data to be written with the page data, based on the skip mask; and
transferring, to the solid-state memory, the page data.

10. The invention of claim 9, wherein the step of transferring from the communication link further comprises segmenting the data for requested sectors into a plurality of smaller data transfers comprising one or more contiguous chunks.

11. The invention of claim 9, wherein the steps performed at the flash translation layer on a first set of one or more chunks, and the steps performed at the buffer layer on a second set of one or more chunks, are performed in parallel.

12. The invention of claim 9, wherein, for the method, the solid-state memory comprises flash memory.

13. The invention of claim 12, wherein, for the segmenting step, each chunk has a size substantially equal to a page size of the flash memory.

14. The invention of claim 9, wherein, for the segmenting step, each chunk corresponds to N sectors, where N is an integer.

15. The invention of claim 9, wherein the method is implemented by a machine executing program code encoded on a machine-readable storage medium.

16. The invention of claim 9, the method further comprising:
after the transferring to the solid-state memory step:
deallocating, by the buffer layer, the storage space in the buffer.

17. An apparatus for transferring data to or from a plurality of non-contiguous sectors of a solid-state memory, the apparatus comprising:
a host layer module adapted to send data to, and receive commands from, a communication link, wherein received commands are one of read requests or write requests, and wherein the command comprises i) a starting sector address, ii) a skip mask indicating a span of sector addresses in the request and the sectors to be transferred, iii) a total number of sectors to be transferred, and, for write requests, iv) the data to be written to the sectors;
a buffer for storing data to be transferred to or from the solid-state memory;
a buffer layer module for i) managing the buffer, ii) segmenting the span of the request into a plurality of chunks, wherein each chunk corresponds to at least one sector, iii) determining, based on the skip mask, a number of chunks requiring data to be transferred to or from the solid-state memory, iv) allocating storage space in the buffer corresponding to, for read requests, the number of chunks requiring data to be read, and, for write requests, the number of sectors to be written; and
a flash translation layer module for i) retrieving, for a read request, data from the solid-state memory to the buffer for each chunk requiring data to be read, and ii) transferring, for a write request, data from the buffer to the solid-state memory for each chunk to be written.

18. The invention of claim 17, wherein the solid-state memory comprises flash memory.

19. The invention of claim 18, wherein each chunk has a size substantially equal to a page size of the flash memory.

20. The invention of claim 17, wherein the apparatus is implemented in a monolithic integrated circuit chip.

* * * * *